US012536475B2

(12) United States Patent
Tian et al.

(10) Patent No.: US 12,536,475 B2
(45) Date of Patent: Jan. 27, 2026

(54) FEATURE SEGMENTATION-BASED ENSEMBLE LEARNING FOR CLASSIFICATION AND REGRESSION

(71) Applicant: INTERNATIONAL BUSINESS MACHINES CORPORATION, Armonk, NY (US)

(72) Inventors: Lei Tian, Xi'an (CN); Han Zhang, Xi'an (CN); Yi Shao, Xi'an (CN); Dong Hai Yu, Xi'an (CN); Chun Lei Xu, Xi'an (CN); Xiao Ling Yang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 17/709,704

(22) Filed: Mar. 31, 2022

(65) Prior Publication Data

US 2023/0316151 A1    Oct. 5, 2023

(51) Int. Cl.
*G06N 20/20*    (2019.01)

(52) U.S. Cl.
CPC ................... *G06N 20/20* (2019.01)

(58) Field of Classification Search
CPC ...................................... G06N 20/20
See application file for complete search history.

(56) References Cited

U.S. PATENT DOCUMENTS

| 8,762,303 B2 | 6/2014 | Zhao et al. |
| 11,734,614 B1 * | 8/2023 | Wang .................. G06Q 30/016 706/12 |
| 2020/0351191 A1 * | 11/2020 | Lin ........................ H04L 43/18 |

(Continued)

FOREIGN PATENT DOCUMENTS

| CN | 111695626 A | | 9/2020 |
| CN | 114298399 A | * | 4/2022 |
| IN | 202011004239 A | | 2/2020 |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Li Wu Chang
(74) *Attorney, Agent, or Firm* — CHIP LAW GROUP

(57) ABSTRACT

Constructing a feature segment-based ensemble can include generating a data structure for each element of an initial set of training data. Multiple strongly correlated features of the elements can be identified as well as weakly correlated features. For each strongly correlated feature, a feature segmentation training set can be generated, each training set's elements each containing one of the strongly correlated features and excluding other strongly correlated features. One or more machine learning algorithms can be selected from a software library. The one or more machine learning algorithms can be applied to the feature segmentation training sets to train multiple machine learning models. Each machine learning model that improves the predictive accuracy of the feature segment-based ensemble can be integrated in the feature segment-based ensemble.

18 Claims, 8 Drawing Sheets

(56) References Cited

U.S. PATENT DOCUMENTS

2020/0381117 A1* 12/2020 Spenciner .............. A61B 5/165
2022/0027756 A1*  1/2022 Mac Manus ........... G06N 20/00

FOREIGN PATENT DOCUMENTS

KR       20210069898 A  * 12/2019
WO     WO-2012058718 A1 *  5/2012  ............. G06F 17/00

OTHER PUBLICATIONS

Kiziloz, H.E. et al., "Feature Selection with Dynamic Classifier Ensembles," In 2020 IEEE International Conference on Systems, Man, and Cybernetics (SMC), Oct. 11, 2020, pp. 2038-2043, IEEE.

* cited by examiner

| Test 1 | Training Accuracy | 77.94% | 83.87% | 90.04% |
|---|---|---|---|---|
|  | Testing Accuracy | 75.23% | 83.65% | 91.62% |
| Test 2 | Training Accuracy | 82.75% | 83.6% | 91.21% |
|  | Testing Accuracy | 80.28% | 82.17% | 92.06% |

FIG. 4A

| Test 1 | Training Accuracy | 93.55% | 89.32% | 89.96% |
|---|---|---|---|---|
|  | Testing Accuracy | 92.11% | 88.75% | 91.34% |
| Test 2 | Training Accuracy | 94.33% | 88.26% | 91.21% |
|  | Testing Accuracy | 91.78% | 89.88% | 92.06% |

FIG. 4B

| Test 1 | Training Accuracy | 77.94% | 83.87% | 90.59% |
|---|---|---|---|---|
|  | Testing Accuracy | 75.23% | 83.65% | 92.72% |
| Test 2 | Training Accuracy | 82.75% | 83.6% | 91.21% |
|  | Testing Accuracy | 80.28% | 82.17% | 92.06% |

FIG. 4C

FEATURE SEGMENTATION-BASED ENSEMBLE LEARNING FOR CLASSIFICATION AND REGRESSION

TECHNICAL FIELD

This disclosure relates to computer systems, and more particularly, to computer-implemented ensemble learning for training machine learning models.

BACKGROUND

Ensemble learning is a machine learning technique for creating a machine learning model made up of multiple learning algorithms. An ensemble of machine learning models can be created by combining multiple learning algorithms. A model prediction can be generated with an ensemble of machine learning models by averaging the outputs of the independent models of the ensemble or by voting. A machine learning model "votes" by generating a prediction, which counts as a vote in favor of that prediction. Because the different models of the ensemble have different strengths and weakness the voting or averaging tends to reduce the error rate of the predictions, thus enhancing the accuracy of the ensemble. Ensemble models include classification models that classify a target into one of two or more classes. Ensemble models also include regression models for performing regressions. Ensemble models can also perform clustering, feature selection, and dimensionality reduction.

SUMMARY

In one or more embodiments, a method for can include generating a data structure for each element of an initial set of training data, each element's data structure comprising a plurality of fields that each electronically encodes one of a plurality of features of the element. The method can include identifying a plurality of strongly correlated features and one or more weakly correlated features among the plurality of features of the elements of the initial set of training data. For each strongly correlated feature, the method can include generating a feature segmentation training set whose elements each contain only one of the strongly correlated features and exclude all other strongly correlated features. The method can include receiving from a graphical user interface one or more selected machine learning algorithms selected from a collection of machine learning algorithms presented within the graphical user interface and corresponding to code pre-stored in a software library. The method can include training a plurality of machine learning models, each of the plurality of machine learning models trained using code corresponding to one of the one or more selected machine learning algorithms applied to one of the feature segmentation training sets. The method can include generating a feature segmentation-based ensemble comprising two or more of the plurality of machine learning models.

In one or more embodiments, a system includes a processor configured to initiate operations. The operations can include generating a data structure for each element of an initial set of training data, each element's data structure comprising a plurality of fields that each electronically encodes one of a plurality of features of the element. The operations can include identifying a plurality of strongly correlated features and one or more weakly correlated features among the plurality of features of the elements of the initial set of training data. For each strongly correlated feature, the operations can include generating a feature segmentation training set whose elements each contain only one of the strongly correlated features and exclude all other strongly correlated features. The operations can include receiving from a graphical user interface one or more selected machine learning algorithms selected from a collection of machine learning algorithms presented within the graphical user interface and corresponding to code pre-stored in a software library. The operations can include training a plurality of machine learning models, each of the plurality of machine learning models trained using code corresponding to one of the one or more selected machine learning algorithms applied to one of the feature segmentation training sets. The operations can include generating a feature segmentation-based ensemble comprising two or more of the plurality of machine learning models.

In one or more embodiments, a computer program product includes one or more computer readable storage media having instructions stored thereon. The instructions are executable by a processor to initiate operations. The operations can include generating a data structure for each element of an initial set of training data, each element's data structure comprising a plurality of fields that each electronically encodes one of a plurality of features of the element. The operations can include identifying a plurality of strongly correlated features and one or more weakly correlated features among the plurality of features of the elements of the initial set of training data. For each strongly correlated feature, the operations can include generating a feature segmentation training set whose elements each contain only one of the strongly correlated features and exclude all other strongly correlated features. The operations can include receiving from a graphical user interface one or more selected machine learning algorithms selected from a collection of machine learning algorithms presented within the graphical user interface and corresponding to code pre-stored in a software library. The operations can include training a plurality of machine learning models, each of the plurality of machine learning models trained using code corresponding to one of the one or more selected machine learning algorithms applied to one of the feature segmentation training sets. The operations can include generating a feature segmentation-based ensemble comprising two or more of the plurality of machine learning models.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 4A, 4B, and 4C illustrate certain experimental results generated with the system of FIG. 1.

DETAILED DESCRIPTION

Figure 1A:
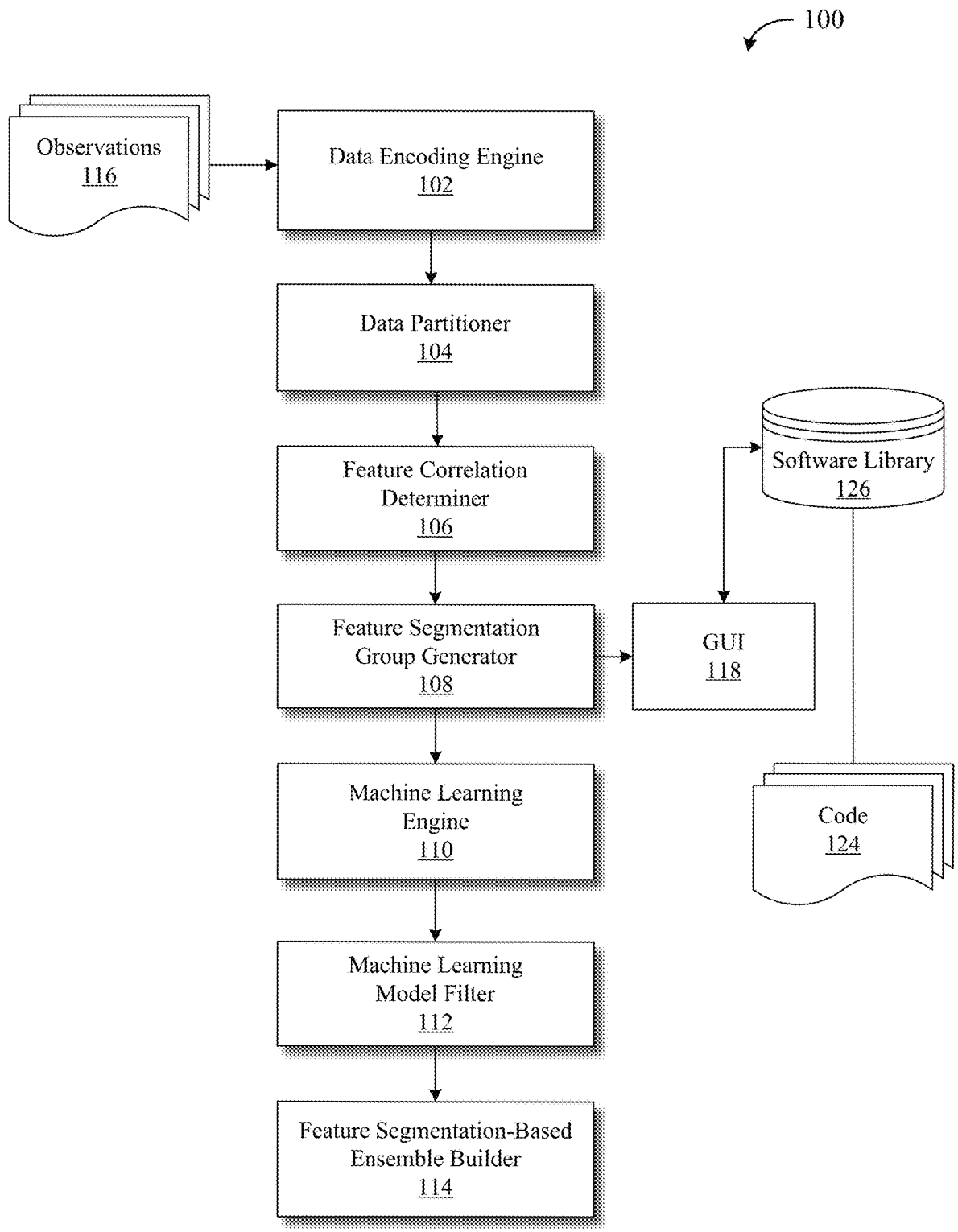
FIGS. 1A and 1B illustrate an example system for building a feature segmentation-based ensemble.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer systems, and more particularly, to computer-implemented ensemble learning for training machine learning models. A core aspect of machine learning is feature selection. Typically, a machine learning model performs a specific task such as classification or regression with respect to a target feature that is likely related linearly or non-linearly to other, independent features or predictors whose values the model uses to accomplish the task. Selection of the best set of features, accordingly, can be critical. Selecting the right set of features has been shown, for example, to improve model performance with respect to both supervised and unsupervised learning, to reduce computational costs for model training, and to mitigate the curse of dimensionality associated with high-dimensional input data.

Highly correlated features can introduce multicollinearity, which can cause the model to perform erratically in response to small changes in the model or the input data. With respect to highly correlated features, a typical response is to throw out all but one of the correlated features. Unless the features thrown out are perfectly correlated with the retained feature, however, some information useful for training a machine learning model may be lost by throwing out the features.

The systems, methods, and computer program products disclosed herein are capable of separating out strongly correlated features, splitting the features into different groups and using the different groups to build distinct models that can be used to build a feature segmentation-based ensemble. The feature segmentation-based ensemble can be trained using multiple machine learning algorithms applied to the different feature groups in constructing the distinct models of the ensemble.

An aspect of the feature segmentation-based ensemble disclosed herein is enhanced accuracy with respect to ensemble predictions, both with respect to regressions and classifications. The feature segmentation-based ensemble can be trained, for example, as a machine learning ensemble for classifying target inputs. Alternatively, the feature segmentation-based ensemble can be trained, for example, as a machine learning ensemble that generates a regression output in response to one or more independent variable input values. With respect to both classifying target inputs and generating regression values, the predictions of the feature segmentation-based ensemble have been shown to be more accurate than conventional machine learning models built with features chosen solely through existing feature selection techniques. In some arrangements, moreover, a feature segmentation-based ensemble can be constructed by coupling the splitting of strongly correlated features into separate groups with feature selection. Using feature segmentation singly or in conjunction with feature selection enhances the predictive accuracy of the feature segmentation-based ensemble.

Another aspect of the feature segmentation-based ensemble is enhanced robustness with respect to changes in the values of the underlying models or data used to train the models of a machine learning ensemble. With a conventional machine learning model, one or more such changes typically necessitate retraining of the entire model. The feature segmentation-based ensemble comprises multiple models, each trained using a different model applied to a distinct set of features. With the feature segmentation-based ensemble—as distinct from conventional machine learning models—only a model of the ensemble that has undergone a change either with respect to the model features or the data used to train the model needs to be re-trained. This enhanced robustness of the feature segmentation-based ensemble reduces, on average over time, the computing resources needed to maintain the feature segmentation-based ensemble's enhanced accuracy.

Further aspects of the inventive aspects described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1B:
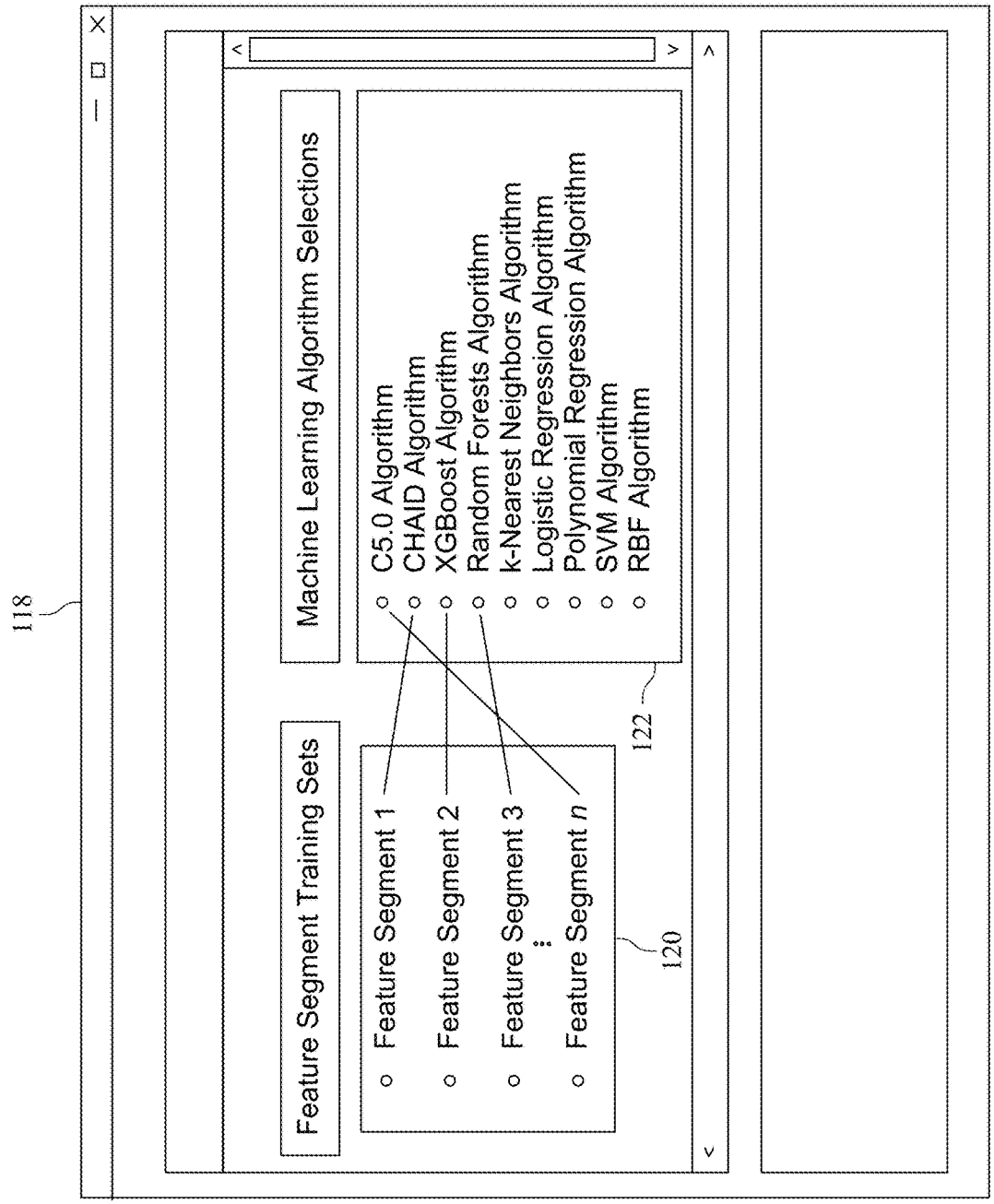
Figure 2:
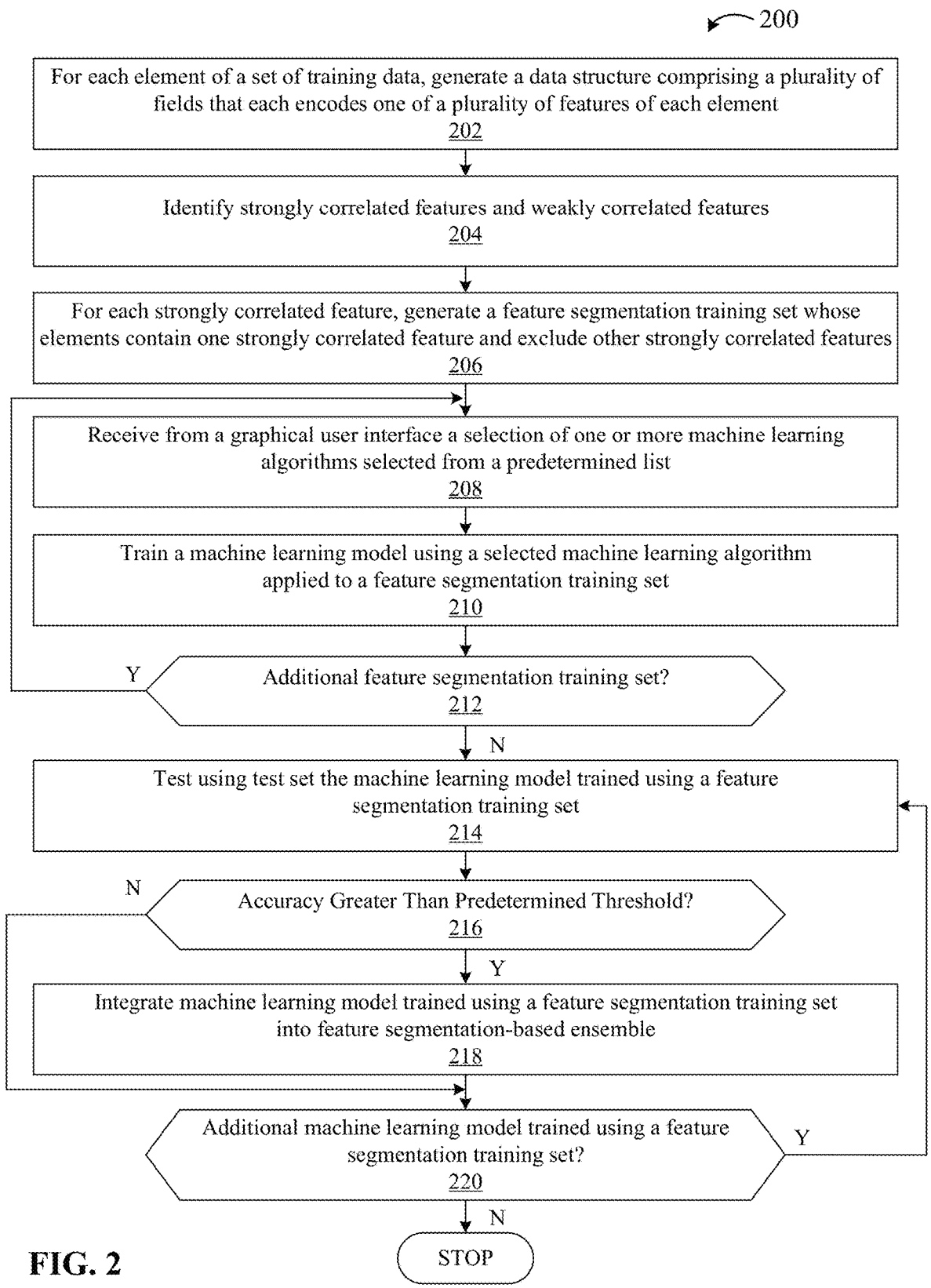
FIG. 2 illustrates an example method performed by the system of FIG. 1.

Referring initially to FIGS. 1A, 1B, and 2, FIGS. 1A and 1B illustrate an example system for constructing feature segment-based ensembles (system) 100, and FIG. 2 illustrates example method 200 performed by system 100. System 100 illustratively includes data encoding engine 102, data partitioner 104, feature correlation determiner 106, feature segmentation group generator 108, machine learning engine 110, machine learning model filter 112, and feature segmentation-based ensemble builder 114.

Figure 5:
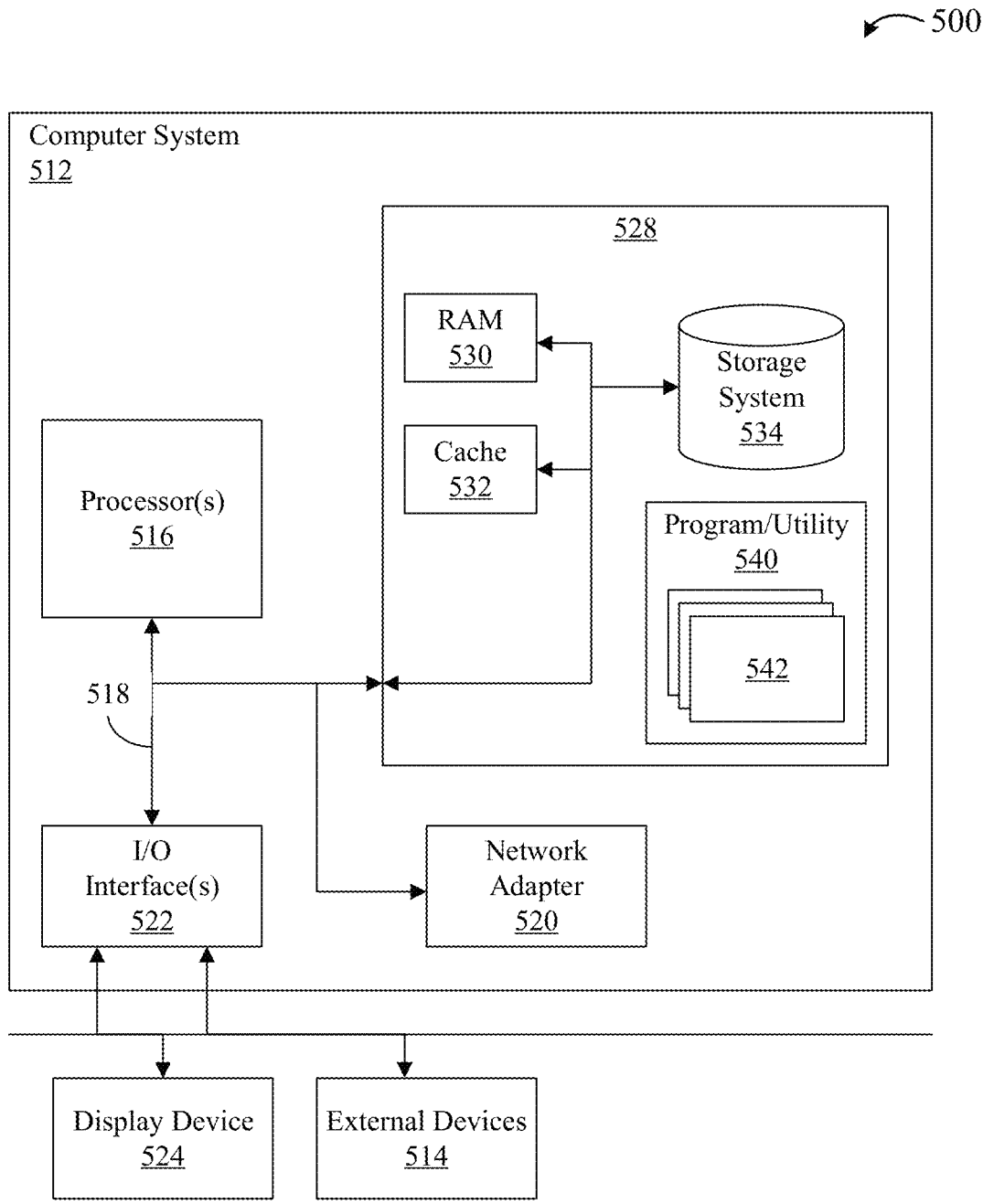
FIG. 5 illustrates a computing node for implementing the system of FIG. 1.

In various embodiments, data encoding engine 102, data partitioner 104, feature correlation determiner 106, feature segmentation group generator 108, machine learning engine 110, machine learning model filter 112, and feature segmentation-based ensemble builder 114 can be implemented in hardware (e.g., dedicated hardwired circuitry), software (e.g., program code executed by one or more processors), or a combination thereof. For example, system 100 in certain embodiments is implemented in a computing node, such as computing node 500 (e.g., cloud-based server), in which system 100 comprises program code that is electronically stored in a memory, such as memory 528, and executes on one or more processors, such as processor 516 of computer system 512 (FIG. 5).

Operatively, at block 202 a data structure for each element of an initial set of training data can be generated by data encoding engine 102. The initial set of training data comprises a plurality of elements corresponding to observations 116. The observations can be collected as examples for training a machine learning model to perform various tasks, such as predicting stock values (regression), detecting malicious text messages (classification), or other machine learning tasks. Observations 116 can correspond to feature vectors $\{\bar{x}_i\}_{i=1}^{N}$, where N is the number of observations. Accordingly, each observation can be represented by a D-dimensional feature vector $\bar{x}_i = \langle x_i^{(1)}, x_i^{(2)}, \ldots, x_i^{(D)} \rangle \in \mathbb{R}^D$, where each $x^{(j)}$, $j=1, \ldots, D$, is a feature whose value describes a corresponding observation. For supervised learning, each observation can be labeled to generate a set of labeled examples $\{(\bar{x}_i, y_i)\}_{i=1}^{N}$, where $y_i$ is a classification, category, or regression value of the i-th observation described by feature vector $\bar{x}_i$. The labeled examples can be partitioned by data partitioner 104 into a training set that is used to train a machine learning model and a test set that is used to test the prediction accuracy of the model once the model is trained. An accurate prediction is one in which the machine learning model generates the correct $y_i$ (e.g., classification or regression) in response to input $\bar{x}_i$.

For each element, $\langle x_i^{(1)}, x_i^{(2)}, \ldots, x_i^{(D)} \rangle$, of the initial set of training data, data encoding engine 102 generates a data structure. Each data structure generated by data encoding engine 102 comprises multiple fields. Each field encodes a feature $x^{(j)}$ that, along with other corresponding features of an element of the initial set of training data, characterizes or describes the element. That is, each set element is represented by a data structure whose fields correspond to the $x^{(j)}$, $j=1, \ldots, D$ of a feature vector $\bar{x}_i = \langle x_i^{(1)}, x_i^{(2)}, \ldots, x_i^{(D)} \rangle$ that describe or characterize an observation.

At block 204, each data structure is filtered through feature correlation determiner 106 to identify which of the features $x^{(j)}$, $j=1, \ldots, D$ are strongly correlated with one another and which are only weakly correlated. In certain arrangements, feature correlation determiner 106 performs a pairwise feature correlation analysis with respect to each pair of features of the data structures. Feature correlation determiner 106 measures how closely a change in one of the pair of features is matched by a concomitant change in the other of the pair of features. The strength of the relationship can be quantitatively measured by feature correlation determiner 106. For example, for features that take on continuous values, the correlation determination by feature correlation determiner 106 can be based on the Pearson correlation coefficient. With ordinal and categorical features, for example, the correlation determination by feature correlation determiner 106 can be based on the Spearman rank correlation coefficient. In other arrangements, different correlation coefficients or other statistically based measures can be used by feature correlation determiner 106 in determining how strongly two features are correlated with one another. In some arrangements, feature pairs for which a corresponding correlation coefficient is greater than a predetermined threshold are tagged by feature correlation determiner 106 for further processing as described below.

In certain arrangements, the user can select how strongly correlated features must be for feature correlation determiner 106 to identify the features as strongly correlated. For example, in some arrangements, feature correlation determiner 106 may only identify features as strongly correlated if the Pearson correlation coefficient is one. In other arrangements, for example, feature correlation identifier 106 may identify features as strongly correlated if the Pearson correlation is at least substantially close to one (e.g., 0.85). In other arrangements, feature correlation determiner 106 can identify strongly correlated features based on a Spearman rank correlation coefficient of one or close to one.

In still other arrangements, feature correlation determiner 106 can determine the strength of the interrelationship between pairs of features based on a domain knowledge graph. A knowledge graph, also referred to as a semantic network, comprises nodes, edges, and labels. Edge-connected nodes correspond to correlated features. The labels can indicate the strength of the correlation between a pair of nodes representing two different features. The domain knowledge graph can be derived from one or more sources of subject matter expertise (SME) and be input to feature correlation determiner 106 for determining which features are strongly correlated with one another and which are only weakly or not at all correlated.

At block 206, feature segmentation group generator 108 segments each feature determined to be strongly correlated, and for each strongly correlated feature generates a distinct feature segmentation training set. Thus, rather than discard highly correlated features, as with conventional feature selection, system 100 builds a unique feature segmentation training set corresponding to each of the highly correlated features. That is, one distinct feature segmentation training set for each strongly correlated feature identified. The features of each element of a feature segmentation training set therefore include one, and only one, of the features identified as strongly correlated with one or more other features.

In some arrangements, feature segmentation group generator 108 generates a feature segmentation training set for each of the strongly correlated features by reconfiguring the data structures of the elements of the initial set of training data. A duplicate copy of the data structures of the elements of the initial set of training data can be generated corresponding to each feature segmentation training set. For each element—also a feature vector—of a duplicated initial training set, a new data structure can be generated by retaining the field containing a corresponding strongly correlated feature separated out from the other features with which it is strongly correlated. Any feature fields containing another strongly correlated feature are extracted or eliminated from the newly generated data structure. Accordingly, each feature segmentation training set uniquely contains one, and only one, of the separated features identified as strongly correlated but also contains each of the weakly correlated features.

In other arrangements, different ones of the weakly correlated features are distributed among the different feature segmentation training sets generated by feature segmentation group generator 108. Data structures of each of the feature segmentation training sets are thus a reconfiguration of the data structures of the initial training set elements, the reconfiguration eliminating all weakly correlated features save the one(s) allocated to the specific feature segmentation training set. The weakly correlated features, in certain arrangements, are allocated among the feature segmentation training sets based on the correlations among each feature of a feature segmentation training set. For example, the allocation can be one in which the sum of the pairwise correlation coefficients associated with each feature segmentation training set is minimized. In still other arrangements, the weakly correlated features are allocated among the different feature segmentation training sets randomly.

At block 208, a selection a machine learning algorithm is received from graphical user interface (GUI) 118, which interacts with the computer hardware in which system 100 is implemented. Once a plurality of feature segmentation training sets is generated, GUI 118 presents a system user with a list of available machine learning algorithms. An available machine learning algorithm can be selected by the user for generating a machine learning model using a feature segmentation training set to train the machine learning model. In certain arrangements, GUI 118 also identifies each of the plurality of feature segment training sets. Optionally, additional information such as the features of the elements of each feature segment training set, the correlations among the features, and other information that can inform the user in selecting a machine learning model to train using a selected feature segment training set can be presented in GUI 118.

Referring specifically to FIG. 1B, GUI 118 illustratively presents list 120 of n feature segmentation training sets. The user illustratively chooses or links to one of machine learning algorithms 122. In response to the user's selection, system 100 retrieves code 124 from software library 126. Running on one or more processors, code 124 can implement any of various machine learning algorithms selected by the user. The machine learning algorithms, for example, can include a chi-square automatic interaction detection (CHAID) algorithm, extreme gradient boost (XGBoost) algorithm, random forest algorithm, k-nearest neighbor algorithm, logistic regression algorithm, polynomial regression algorithm, support vector machine (SVM) algorithm, radial basis function (RBF) algorithm for a neural network, or other machine learning algorithm.

At block 210, machine learning engine implements portions of code 124 corresponding to a selected machine learning algorithm for generating a machine learning model that is trained using one of the user-selected feature segment training sets. At block 212, if there is an additional feature segmentation training set, the user is prompted to select a machine learning algorithm for generating a machine learning model that is trained with the feature segmentation training set. In response to a user selecting another of the machine learning algorithms 122, the additional machine learning model is trained using another of the feature segmentation training sets.

Each machine learning model trained using one of the feature segmentation training sets is a candidate for inclusion in a feature segmentation-based ensemble constructed by feature segmentation-based ensemble builder 114. The feature segmentation-based ensemble is constructed by feature segmentation-based ensemble builder 114 integrating into the ensemble each of the candidate machine learning models that enhances the predictive accuracy of feature segmentation-based ensemble.

In certain arrangements, at block 214, machine learning model filter 112 filters each machine learning model trained using a feature segmentation training set. If at block 216 the accuracy of the machine learning is greater than a predetermined threshold, then the machine learning model is integrated into the feature segmentation-based ensemble at block 218. The process continues at block 220 if there are additional machine learning models for testing.

Once the feature segmentation-based ensemble is built by feature segmentation-based ensemble builder 114, the feature segmentation-based ensemble is used to generate predictions in response to target data inputs. The predictions generated by the feature segmentation-based ensemble are more accurate, on average, than any individual prediction generated by any one of the machine learning models integrated in the ensemble. Moreover, the feature segmentation-based ensemble is more robust than the individual machine learning models to changes over time with respect to model structure or training data.

The feature segmentation-based ensemble built by system 100 can integrate different machine learning models that enable the feature segmentation-based ensemble to generate different types of predictions. In classifying a target input, for example, the feature segmentation-based ensemble can generate the classification prediction based on a confidence weighted voting, each "vote" corresponding to a classification prediction generated by one of the machine learning models of the feature segmentation-based ensemble. With confidence weighted voting, the feature segmentation-based ensemble makes the classification based on which of multiple classes or categories receives the greatest number of votes, each vote weighted by the probabilistically determined confidence level of the specific model's classification. Built by system 100 for performing regressions, the feature segmentation-based ensemble can generate a predicted value based on an average of the weighted regressions of the individual machine learning models integrated in the feature segmentation-based ensemble.

Figure 3:
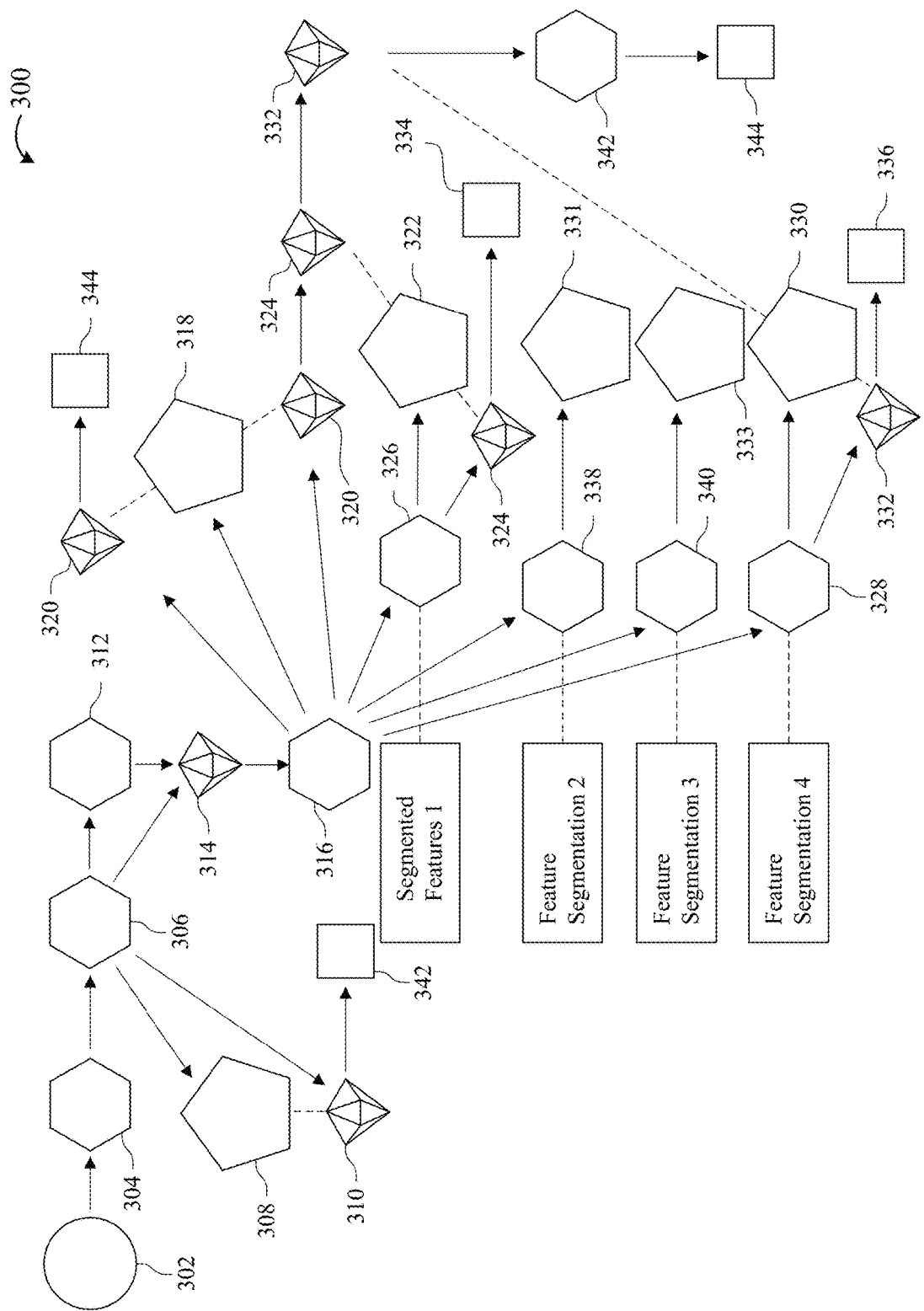
FIG. 3 schematically illustrates certain operative aspects of the system of FIG. 1.

FIG. 3 schematically illustrates certain operative aspects 300 of system 100 in building a feature segmentation-based ensemble that provides business analytics based on data retrieved from customer database 302. System 100 can train the feature segmentation-based ensemble, for example, to classify customers according to whether a customer is likely to visit a brick-and-mortar outlet or make purchases online. The feature segmentation-based ensemble, for example, can be trained by system 100 to generate regression values predicting the amount of purchases a customer is likely to make over a specific time interval. The data is partitioned by system 100 at node 304 into a training set used to construct the feature segmentation-based ensemble and a test set for testing the accuracy of the ensemble once trained. At node 306, system 100 encodes the features for processing.

Optionally, at modelling node 308, system 100 trains model 310 using training data without either feature segmentation or feature selection. At modeling node 312, system 100 trains model 314 and applies feature selection at node 316. Using data comprising selected features, at node 318 system 100 trains feature selection model 320.

At node 322, system 100 trains feature segmentation model 324 using a training set generated at node 326 comprising segmented features 1. System 100, at node 328 generates a training set comprising segmented features 4 for training at node 330 feature segmentation model 332. Using test data obtained by data partitioning at node 304, system 100 at nodes 334 and 336, respectively, determines that the predictive accuracy of both feature segmentation model 324 and feature segmentation model 332 meet a predetermined threshold and thus can be used in building a feature segmentation-based ensemble. Feature segmentation models trained by system 100 at nodes 331 and 333 using training sets generated at nodes 338 and 340, respectively, and comprising segmented features 2 and segmented features 3, respectively, are determined by system 100 not to meet the predetermined threshold and are discarded. A feature segmentation-based ensemble that combines feature segmentation and feature selection is generated at node 342 by system 100 combining feature selection model 320, feature segmentation model 324, and feature selection model 332 (shown as linked together with node 338). Using test data obtained by data partitioning at node 304, system 100 can determine at node 344 the predictive accuracy for classification or regressions generated with the feature segmentation-based ensemble. The predictive accuracy can be compared with that determined at node 342 for model 310 trained without feature selection or feature segmentation and that determined at node 344 for model 320 trained using only feature selection.

FIGS. 4A-4C provide summary statistics obtained using the procedures described in FIG. 3. FIG. 4A provides data on the accuracy of prediction models in which feature segmentation and feature selection were made based on an SME-determined knowledge graph. The third column is the accuracy of a model trained using the CHAD algorithm without feature selection. The fourth column is the accuracy of a model trained using the CHAID algorithm applied to a training set generated using feature selection. The fifth column is the accuracy of a feature segmentation-based ensemble which combined feature segmentation and feature selection, the models trained using the CHAID algorithm. FIG. 4B provides data on the accuracy of prediction models in which feature segmentation and feature selection were made based on an SME-determined knowledge graph and different machine learning models were used. The third column is the accuracy of a model trained using the XGBoost algorithm. The fourth column is the accuracy of a model trained using the random forest algorithm without feature segmentation or feature selection. The fifth column is the accuracy of a feature segmentation-based ensemble which combined feature segmentation and feature selection, the models trained using the CHAID algorithm. FIG. 4C provides data on the accuracy of prediction models in which feature segmentation and feature selection were made based on feature correlation analysis. The third column is the accuracy of a model trained using the CHAD algorithm without feature selection. The fourth column is the accuracy of a model trained using the CHAID algorithm applied to a training set generated using feature selection. The fifth column is the accuracy of a feature segmentation-based ensemble which combined feature segmentation and feature selection, the models trained using the CHAID algorithm. In each of the experiments, the data shows that the feature segmentation-based ensemble, combined with feature selection, outperforms all the other machine learning models.

FIG. 5 illustrates a schematic of an example of a computing node 500. In one or more embodiments, computing node 500 is an example of a suitable cloud computing node. Computing node 500 is not intended to suggest any limitation as to the scope of use or functionality of embodiments of the invention described herein. Computing node 500 is capable of performing any of the functionality described within this disclosure.

Computing node 500 includes a computer system 512, which is operational with numerous other general-purpose or special-purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 512 is shown in the form of a general-purpose computing device. The components of computer system 512 may include, but are not limited to, one or more processors 516, a memory 528, and a bus 518 that couples various system components including memory 528 to processor 516. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 518 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 512 typically includes a variety of computer system-readable media. Such media may be any available media that is accessible by computer system 512, and may include both volatile and non-volatile media, removable and non-removable media.

Memory 528 may include computer system readable media in the form of volatile memory, such as random-access memory (RAM) 530 and/or cache memory 532. Computer system 512 may further include other removable/non-removable, volatile/non-volatile computer system storage media. By way of example, storage system 534 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. For example, one or more of the program modules may include a system for building a feature segmentation-based ensemble, such as system 100, or portions thereof.

Program/utility 540 is executable by processor 516. Program/utility 540 and any data items used, generated, and/or operated upon by computer system 512 are functional data structures that impart functionality when employed by computer system 512. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via input/output (I/O) interfaces 522. Still, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

While computing node 500 is used to illustrate an example of a cloud computing node, it should be appreciated that a computer system using an architecture the same as or similar to that described in connection with FIG. 5 may be used in a non-cloud computing implementation to perform the various operations described herein. In this regard, the example embodiments described herein are not intended to be limited to a cloud computing environment. Computing node 500 is an example of a data processing system. As defined herein, "data processing system" means one or more hardware systems configured to process data, each hardware system including at least one processor programmed to initiate operations and memory.

Computing node 500 is an example of computer hardware. Computing node 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 500 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
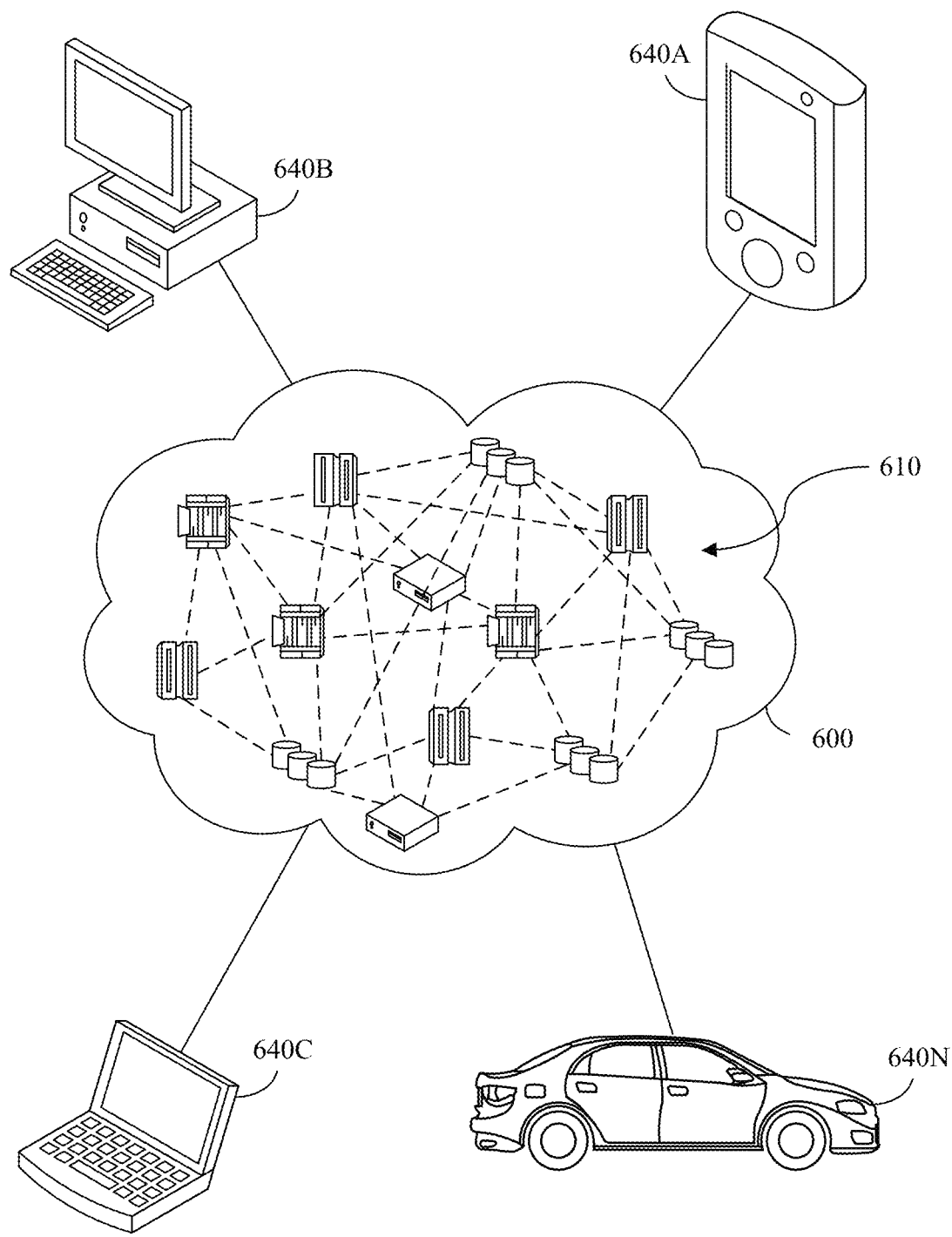
FIG. 6 illustrates a cloud computing environment.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 640a, desktop computer 640b, laptop computer 640c, and/or automobile computer system 640n may communicate. Computing nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640a-n shown in FIG. 6 are intended to be illustrative only and that computing nodes 610 and cloud computing environment 600 can communicate with any type of computerized device over any type of network and/or network addressable connection (e.g., using a web browser).

Figure 7:
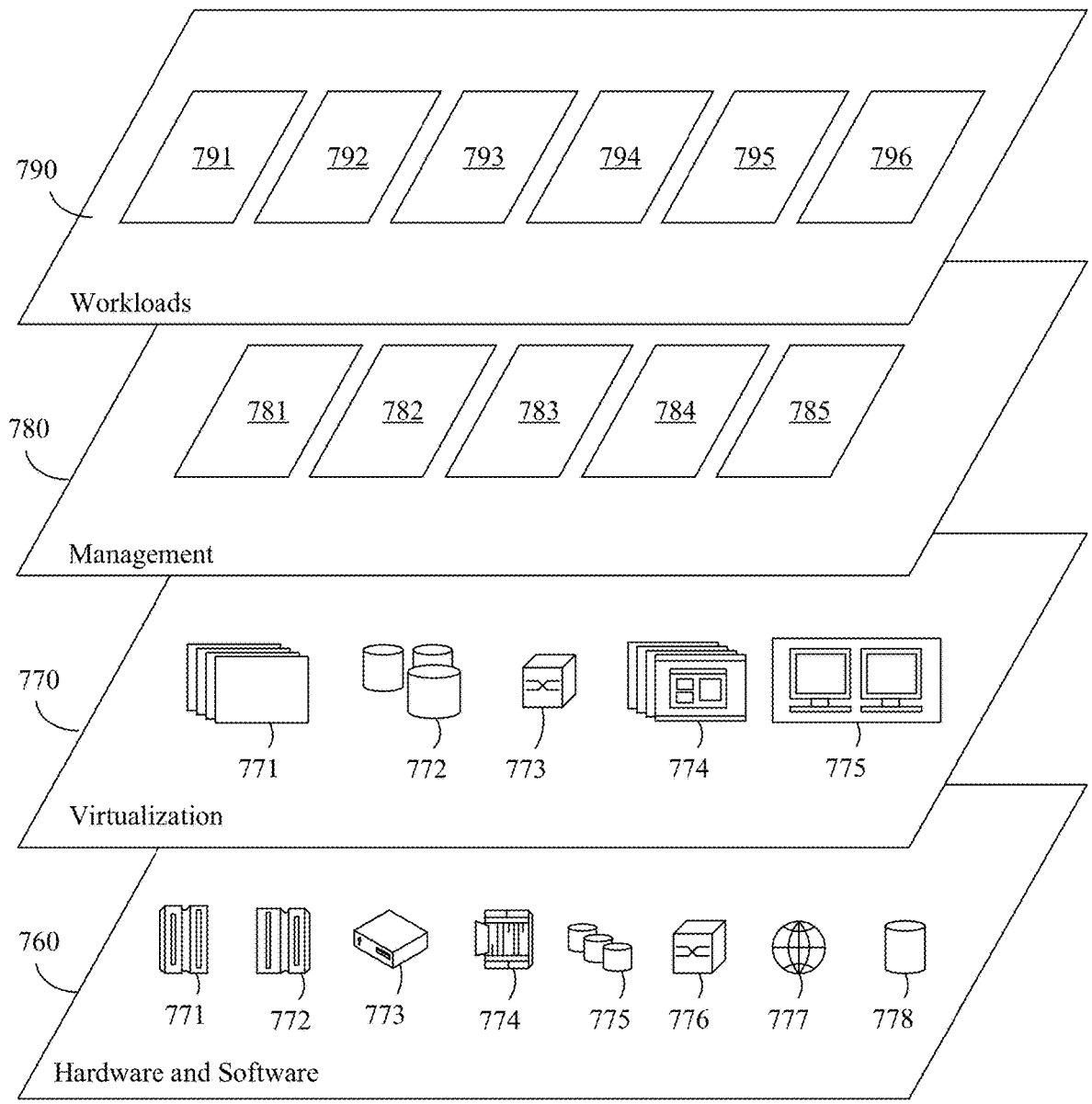
FIG. 7 illustrates example abstraction model layers of the cloud computing environment of FIG. 6.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workload layer 790 provides examples of functionality for which the cloud computing environment may be utilized. Included among examples of workloads and functions which may be provided from this layer are: mapping and navigation 791; software development and lifecycle management 792; virtual classroom education delivery 793; data analytics processing 794; transaction processing 795; and system 796 for building a feature segmentation-based ensemble.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise, the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" can refer to an organization as well as an individual human being. "Enterprise" refers to an example organization of multiple individuals.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within a computer hardware system, the computer-implemented method comprising:
    generating a data structure for each element of a plurality of elements of an initial set of training data, wherein
        the data structure of each element of the plurality of elements comprises a plurality of fields, and
        each field of the plurality of fields electronically encodes a feature of a plurality of features of a respective element of the plurality of elements;
    identifying, based on the data structure, a plurality of strongly correlated features and one or more weakly correlated features among the plurality of features of the plurality of elements of the initial set of training data;
    for each strongly correlated feature of the plurality of strongly correlated features, generating a distinct feature segmentation training set of a plurality of feature segmentation training sets, wherein
        elements of each distinct feature segmentation training set of the plurality of feature segmentation training sets contain one strongly correlated feature of the plurality of strongly correlated features, and
        the generating of the distinct feature segmentation training set comprises reconfiguring the initial set of training data by:
            duplicating the initial set of training data;
            retaining a first field, of the plurality of fields containing a first strongly correlated feature of the plurality of strongly correlated features, for each element of a plurality of elements of the duplicated initial set of training data; and
            extracting a second field of the plurality of fields of the duplicated initial set of training data that contains a second strongly correlated feature of the plurality of strongly correlated features;
    receiving, based upon a user input, selection of a respective machine learning algorithm for each generated distinct feature segmentation training set of the plurality of feature segmentation training sets, wherein
        the respective machine learning algorithm is selected from a collection of machine learning algorithms presented within a graphical user interface interacting with the computer hardware system, and
        the respective machine learning algorithm corresponding to code pre-stored in a software library;
    training a plurality of machine learning models using a machine learning engine, wherein
        each of the plurality of machine learning models is trained using the pre-stored code corresponding to the respective selected machine learning algorithm applied to the generated distinct feature segmentation training set of the plurality of feature segmentation training sets; and
    generating a feature segmentation-based ensemble comprising two or more trained machine learning models of the plurality of trained machine learning models.

2. The computer-implemented method of claim 1, wherein
    the identifying of the plurality of strongly correlated features comprises:
        performing feature correlation analysis with respect to each pair of features of the plurality of elements of the initial set of training data; and
        tagging, as strongly correlated, a pair of features of the plurality of features of the plurality of elements of the initial set of training data based on a corresponding correlation coefficient derived from the feature correlation analysis is greater than a predetermined threshold.

3. The computer-implemented method of claim 1, wherein the identifying of the plurality of strongly correlated features is based on a predetermined domain knowledge guide.

4. The computer-implemented method of claim 1, further comprising the adding one or more machine learning models of the plurality of machine learning models, wherein the adding of the one or more machine learning models comprises:

determining a respective accuracy of each machine learning model of the plurality of machine learning models based on a set of testing data; and integrating each machine learning model of the one or more machine learning models having the respective accuracy greater than a predetermined threshold into the feature segmentation-based ensemble.

5. The computer-implemented method of claim 1, further comprising:

allocating the one or more weakly correlated features among the plurality of feature segmentation training sets, wherein the allocating is based on correlations between each weakly correlated feature of the one or more weakly correlated features and each strongly correlated feature of the plurality of strongly correlated features.

6. The computer-implemented method of claim 1, further comprising:

randomly allocating the one or more weakly correlated features among each distinct feature segmentation training set of the plurality of feature segmentation training sets.

7. The computer-implemented method of claim 1, further comprising:

generating, with the feature segmentation-based ensemble, a classification prediction based on confidence weighted voting on a plurality of classification predictions generated by the two or more trained machine learning models.

8. The computer-implemented method of claim 1, further comprising:

generating, with the feature segmentation-based ensemble, a regression prediction based on confidence weighted averaging of a plurality of regression predictions generated by the two or more trained machine learning models.

9. The computer-implemented method of claim 1, wherein the plurality of strongly correlated features are features having a Pearson correlation of one.

10. A system, comprising:

a processor configured to initiate operations including:

generating a data structure for each element of a plurality of elements of an initial set of training data, wherein the data structure of each element of the plurality of elements comprises a plurality of fields, and each field of the plurality of fields electronically encodes a feature of a plurality of features of a respective element of the plurality of elements;

identifying, based on the data structure, a plurality of strongly correlated features and one or more weakly correlated features among the plurality of features of the plurality of elements of the initial set of training data;

for each strongly correlated feature of the plurality of strongly correlated features, generating a distinct feature segmentation training set of a plurality of feature segmentation training sets, wherein elements of each distinct feature segmentation training set of the plurality of feature segmentation training sets contain one strongly correlated feature of the plurality of strongly correlated features, and the generating of the distinct feature segmentation training set comprises reconfiguring the initial set of training data by:

duplicating the initial set of training data;

retaining a first field, of the plurality of fields containing a first strongly correlated feature of the plurality of strongly correlated features, for each element of a plurality of elements of the duplicated initial set of training data; and extracting a second field of the plurality of fields of the duplicated initial set of training data that contains a second strongly correlated feature of the plurality of strongly correlated features;

receiving, based upon a user input, selection of a respective machine learning algorithm for each generated distinct feature segmentation training set of the plurality of feature segmentation training sets wherein the respective machine learning algorithm is selected from a collection of machine learning algorithms presented within a graphical user interface interacting with the system, and the respective machine learning algorithm corresponds to code pre-stored in a software library;

training a plurality of machine learning models, wherein each of the plurality of machine learning models is trained using the pre-stored code corresponding to the respective selected machine learning algorithm applied to the generated distinct feature segmentation training set of the plurality of feature segmentation training sets; and generating a feature segmentation-based ensemble comprising two or more trained machine learning models of the plurality of trained machine learning models.

11. The system of claim 10, wherein the identifying of the plurality of strongly correlated features includes:

performing feature correlation analysis with respect to each pair of features of the plurality of elements of the initial set of training data; and tagging, as strongly correlated, a pair of features of the plurality of features of the plurality of elements of the initial set of training data based on a corresponding correlation coefficient derived from the feature correlation analysis is greater than a predetermined threshold.

12. The system of claim 10, wherein the identifying of the plurality of strongly correlated features is based on a predetermined domain knowledge guide.

13. The system of claim 10, wherein the processor is further configured to initiate the operations further including adding one or more machine learning models of the plurality of machine learning models, wherein the adding of the one or more machine learning models comprises:

determining a respective accuracy of each machine learning model of the plurality of machine learning models based on a set of testing data; and integrating each machine learning model of the one or more machine learning models having the respective accuracy greater than a predetermined threshold into the feature segmentation-based ensemble.

14. The system of claim 10, wherein the processor is configured to initiate the operations further including:

allocating the one or more weakly correlated features among the plurality of feature segmentation training sets, wherein the allocating is based on correlations between each weakly correlated feature of the one or more weakly correlated features and each strongly correlated feature of the plurality of strongly correlated features.

15. The system of claim 10, wherein the processor is configured to initiate the operations further including:
randomly allocating the one or more weakly correlated features among each distinct feature segmentation training set of the plurality of feature segmentation training sets.

16. The system of claim 10, wherein the processor is configured to initiate the operations further including:
generating, with the feature segmentation-based ensemble, a classification prediction based on confidence weighted voting on a plurality of classification predictions generated by the two or more trained machine learning models.

17. The system of claim 10, wherein the processor is configured to initiate the operations further including:
generating, with the feature segmentation-based ensemble, a regression prediction based on confidence weighted averaging of a plurality of regression predictions generated by the two or more trained machine learning models.

18. A computer program product, the computer program product comprising:
one or more computer-readable storage media and program instructions collectively stored on the one or more computer-readable storage media, the program instructions executable by a processor to cause the processor to initiate operations including:
generating a data structure for each element of a plurality of elements of an initial set of training data, wherein
the data structure of each element of the plurality of elements comprises a plurality of fields, and
each field of the plurality of fields electronically encodes a feature of a plurality of features of a respective element of the plurality of elements;
identifying, based on the data structure, a plurality of strongly correlated features and one or more weakly correlated features among the plurality of features of the plurality of elements of the initial set of training data;
for each strongly correlated feature of the plurality of strongly correlated features, generating a distinct feature segmentation training set of a plurality of feature segmentation training sets, wherein
elements of each distinct feature segmentation training set of the plurality of feature segmentation training sets contain one strongly correlated feature of the plurality of strongly correlated features, and
the generating of the distinct feature segmentation training set comprises reconfiguring the initial set of training data by:
duplicating the initial set of training data;
retaining a first field, of the plurality of fields containing a first strongly correlated feature of the plurality of strongly correlated features, for each element of a plurality of elements of the duplicated initial set of training data; and
extracting a second field of the plurality of fields of the duplicated initial set of training data that contains a second strongly correlated feature of the plurality of strongly correlated features;
receiving, based upon a user input, selection of a respective machine learning algorithm for each generated distinct feature segmentation training set of the plurality of feature segmentation training sets, wherein
the respective machine learning algorithm is selected from a collection of machine learning algorithms presented within a graphical user interface, and
the respective machine learning algorithm corresponds to code pre-stored in a software library;
training a plurality of machine learning models, wherein
each of the plurality of machine learning models is trained using the pre-stored code corresponding to the respective selected machine learning algorithm applied to the generated distinct feature segmentation training set of the plurality of feature segmentation training sets; and
generating a feature segmentation-based ensemble comprising two or more trained machine learning models of the plurality of trained machine learning models.

* * * * *